United States Patent
Shin et al.

(10) Patent No.: US 9,316,859 B2
(45) Date of Patent: Apr. 19, 2016

(54) LIQUID CRYSTAL DISPLAY DEVICE AND METHOD FOR MANUFACTURING THE SAME

(75) Inventors: DongUk Shin, Daegu (KR); SungIl Park, Daegu (KR); SungMin Lee, Gumi-si (KR); SunJa Park, Gyeongsangbuk-do (KR); Bo-Yeol Kim, Gyeongsangbuk-do (KR); Daejin Lee, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 188 days.

(21) Appl. No.: 13/566,565

(22) Filed: Aug. 3, 2012

(65) Prior Publication Data

US 2013/0088672 A1    Apr. 11, 2013

(30) Foreign Application Priority Data

Oct. 11, 2011   (KR) ................. 10-2011-0103527
Jun. 19, 2012   (KR) ................. 10-2012-0065621

(51) Int. Cl.
*G02F 1/1335* (2006.01)
*G02F 1/1345* (2006.01)
*G02F 1/1362* (2006.01)
*G02F 1/1333* (2006.01)

(52) U.S. Cl.
CPC ........ *G02F 1/133512* (2013.01); *G02F 1/1345* (2013.01); *G02F 1/136209* (2013.01); *G02F 1/133509* (2013.01); *G02F 2001/133334* (2013.01); *G02F 2001/133388* (2013.01); *G02F 2001/136218* (2013.01); *G02F 2201/121* (2013.01)

(58) Field of Classification Search
CPC ................... G02F 1/133512; G02F 1/136204; G02F 1/1339; G02F 2202/22; G02F 1/136209; G02F 1/13452; G02F 1/1345; G02F 1/133509; G02F 2001/133334; G02F 2001/133388; G02F 2001/136218; G02F 2201/121
USPC ............. 349/40, 58, 110, 111, 153, 155, 157, 349/149, 152
See application file for complete search history.

(56) References Cited

U.S. PATENT DOCUMENTS 6,034,757 A      3/2000  Yanagawa et al.
6,556,263 B2 *   4/2003  Gu ................................. 349/96

(Continued)

FOREIGN PATENT DOCUMENTS

CN          1637550 A       7/2005
CN        102495493 A       6/2012
KR       20030041828 A       5/2003

OTHER PUBLICATIONS

Office Action issued in Chinese Patent Application No. 201210287475.4, mailed Nov. 3, 2014, 8 pages, English language portions only.

*Primary Examiner* — Michael Caley
*Assistant Examiner* — Angela Davison
(74) *Attorney, Agent, or Firm* — Brinks Gilson & Lione (57) ABSTRACT

A liquid crystal display device and a method for manufacturing the same are disclosed. The liquid crystal display device comprises first and second substrates facing each other; a transparent conductive film formed on one surface of the first substrate, absorbing charges of electro static discharge (ESD); a black matrix including a first black matrix formed on a corner of the other surface of the first substrate and end portions spaced apart from one end of the first black matrix at a predetermined interval for insulation; a ground electrode formed on one surface of the second substrate; and a connection portion connecting the transparent conductive film with the ground electrode, and extending over the end portions.

12 Claims, 6 Drawing Sheets

(56) References Cited

U.S. PATENT DOCUMENTS

| | | | |
|---|---|---|---|
| 7,019,800 B2* | 3/2006 | Kuo | G02F 1/136209 349/110 |
| 7,969,537 B2* | 6/2011 | Pan | 349/110 |
| 2004/0212760 A1 | 10/2004 | Fujibayashi et al. | |
| 2005/0134764 A1* | 6/2005 | Jeoung | G02F 1/133512 349/110 |
| 2010/0079693 A1* | 4/2010 | Yoshida et al. | 349/40 |
| 2011/0051069 A1* | 3/2011 | Yamada et al. | 349/153 |
| 2011/0102719 A1* | 5/2011 | Kakehi | G02F 1/134363 349/122 |
| 2013/0141687 A1 | 6/2013 | Wang | |

* cited by examiner

FIG. 1

[ Related Art ]

LIQUID CRYSTAL DISPLAY DEVICE AND METHOD FOR MANUFACTURING THE SAME

This application claims the priority and the benefit under 35 U.S.C. §119(a) on Korean Patent Application No. 10-2011-0103527 filed on Oct. 11, 2011 and Korean Patent Application No. 10-2012-0065621 filed on June 19, 2012, the entire contents of which are hereby incorporated by reference.

BACKGROUND

1. Field of the Invention

The present disclosure relates to a liquid crystal display device and a method for manufacturing the same, and more particularly, to a liquid crystal display device of a structure for improving black uniformity.

2. Discussion of the Related Art

A liquid crystal display device is widely used in various fields of notebook computers, monitors, spacecraft, aircraft, and etc. owing to advantages of low power consumption based on a low driving voltage and portability.

The liquid crystal display device includes a lower substrate, an upper substrate, and a liquid crystal layer formed between the lower and upper substrates. In the liquid crystal display device, an alignment state of liquid crystal molecules in the liquid crystal layer is controlled based on whether or not an electric field is applied thereto, and light transmittance is controlled according to the alignment state of liquid crystal molecules, whereby images are displayed thereon.

The liquid crystal display device displays a picture image by controlling light transmittance of a liquid crystal using an electric field. This liquid crystal display device is divided into a vertical electric field type liquid crystal display device and a horizontal electric field type liquid crystal display device depending on a direction of an electric field that drives a liquid crystal.

In the vertical electric field type liquid crystal display device, a common electrode formed on an upper substrate and a pixel electrode formed on a lower substrate are arranged to face each other, whereby a liquid crystal of a twisted nematic (TN) mode is driven by the vertical electric field formed between the common electrode and the pixel electrode.

The vertical electric field type liquid crystal display device has an advantage of a high aperture ratio, whereas it has a drawback of a narrow viewing angle at 90 degree.

In the horizontal electric field type liquid crystal display device, a liquid crystal is driven by a horizontal electric field between a pixel electrode and a common electrode in accordance with an in plane switching (IPS) mode, wherein the pixel electrode and the common electrode are formed on one substrate. This horizontal electric field type liquid crystal display device has an advantage of a wide viewing angle at 160 degree. Hereinafter, the horizontal electric field type liquid crystal display device will be described in more detail.

Figure 1:
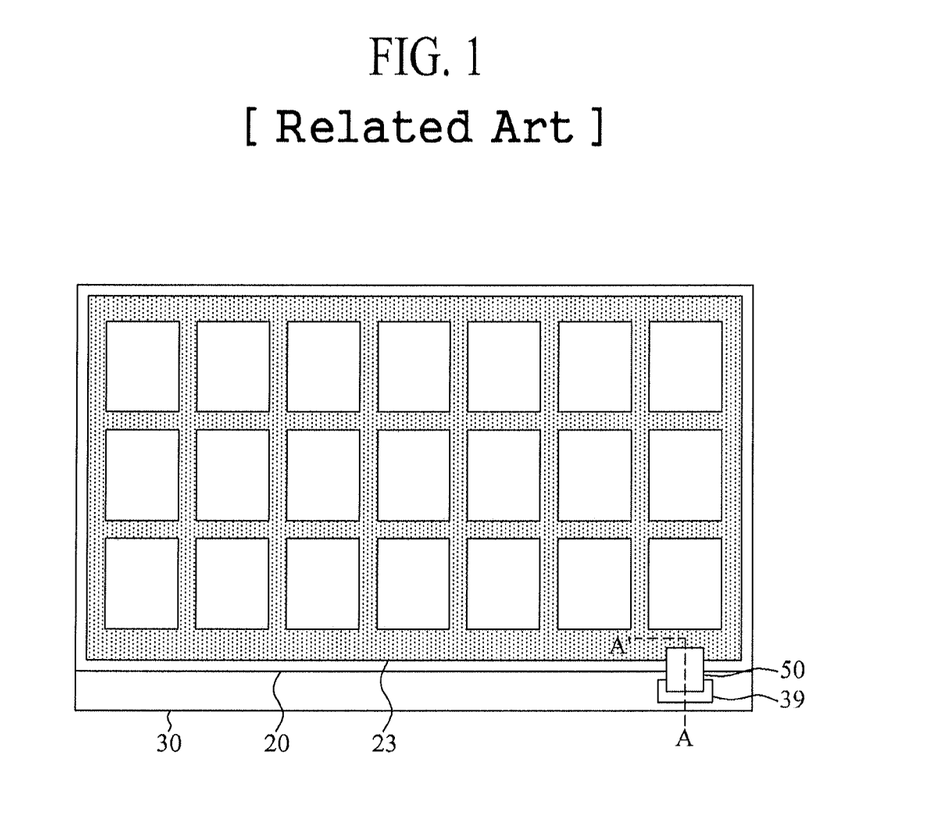
FIG. 1 is a view illustrating a horizontal electric field type liquid crystal display device according to the related art.
Figure 2A:
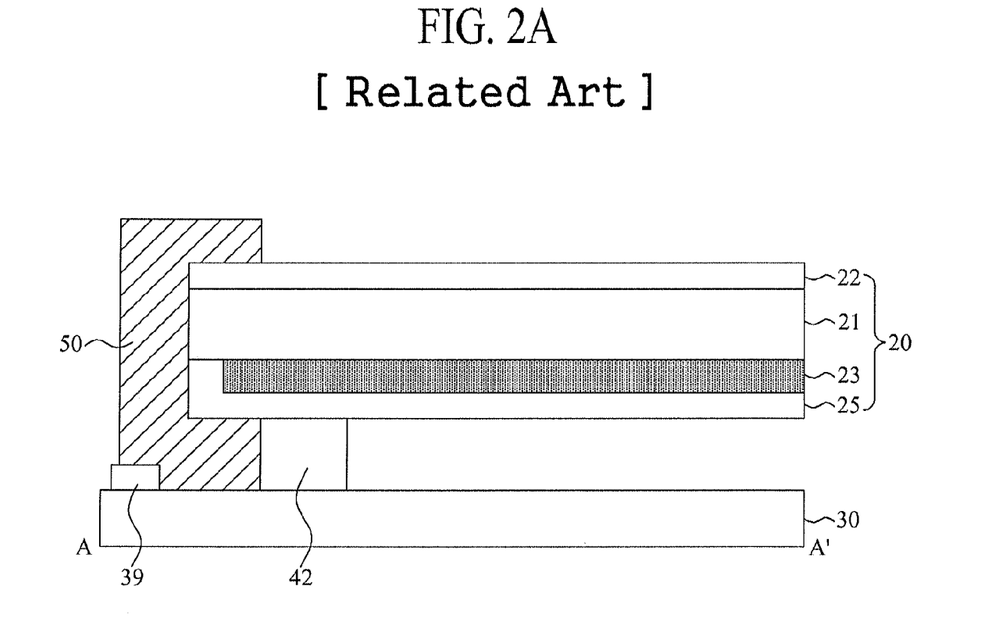
FIG. 2A is a cross-sectional view illustrating a liquid crystal display device taken along line A-A' of FIG. 1.

FIG. 1 is a view illustrating a horizontal electric field type liquid crystal display device according to the related art, and FIG. 2A is a cross-sectional view illustrating the liquid crystal display device taken along line A-A' of FIG. 1.

Referring to FIGS. 1 and 2A, the horizontal electric field type liquid crystal display device according to the related art includes an upper substrate 20, a lower substrate 30, a sealant 42, and an Ag dot 50.

The upper substrate 20 includes a first substrate 21, a black matrix 23, an overcoat layer 25, and a transparent conductive film 22.

The black matrix 23 is formed on one surface of the first substrate 21, the overcoat layer 25 is formed on the black matrix 23, and the transparent conductive film 22, which prevents electro static discharge (ESD) from occurring, is formed on a rear surface of the first substrate 21.

The transparent conductive film 22 is connected with a ground electrode 39 through the Ag dot 50, leaks electro static charges out to the outside, and is formed of indium tin oxide (ITO) which is a transparent conductive material.

Although not shown, the lower substrate 30 includes a second substrate, a thin film transistor, gate lines, data lines, a pixel electrode, a common electrode, and a ground electrode 39.

The upper substrate 20 and the lower substrate 30 are bonded to face each other, and a liquid crystal is injected between the upper substrate 20 and the lower substrate 30.

The sealant 42 is formed along the outside of the upper substrate 20 and the lower substrate 30, and bonds the upper substrate 20 and the lower substrate 30 to each other.

The Ag dot 50 is formed along the outside of the sealant 42, and electrically connects the transparent conductive film 22 of the upper substrate 20 with the ground electrode 39 of the lower substrate 30.

However, the aforementioned horizontal electric field type liquid crystal display device has problems as follows.

Figure 2B:
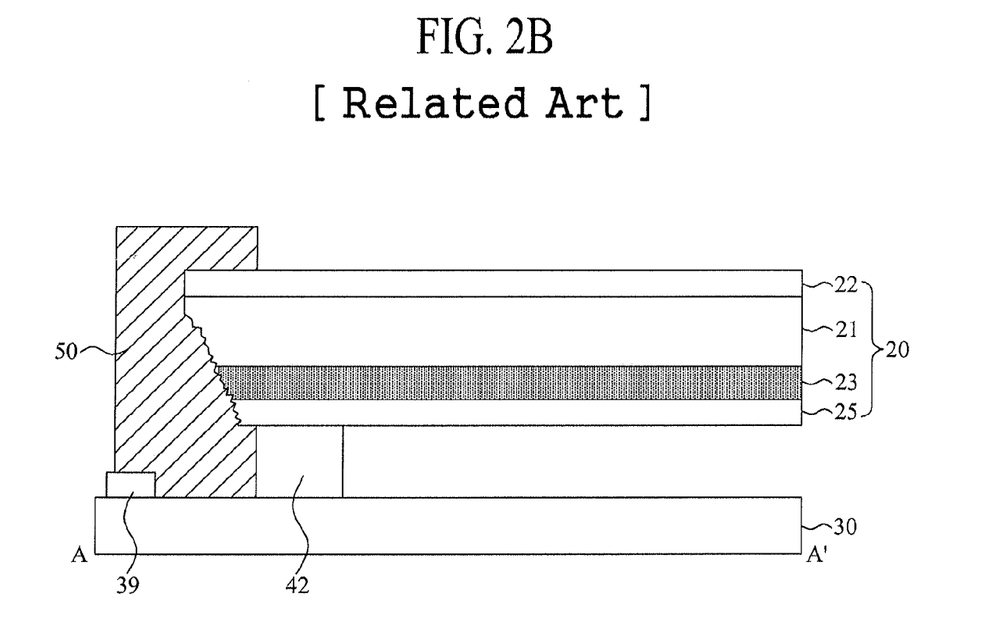
FIG. 2B illustrates problems of a liquid crystal display device according to the related art.

FIG. 2B illustrates problems of the liquid crystal display device according to the related art.

As shown in FIG. 2B, one end of the upper substrate 20 may be removed when cutting the upper substrate 20 in a scribing process.

If such removal occurs, one end of the black matrix 23 surrounded by the overcoat layer 25 is exposed, and the exposed portion is shorted from the Ag dot 50. Accordingly, the charges of ESD may flow into the upper substrate 20 along the black matrix 23.

In this way, an irregular voltage may be generated and applied along the black matrix 23, so that a black uniformity defect occurs in a liquid crystal display panel.

The black uniformity defect means that a black region is not formed uniformly on an entire surface of the liquid crystal display panel and a bright spot occurs on some surface of the liquid crystal display panel.

BRIEF SUMMARY

A liquid crystal display device comprises first and second substrates facing each other; a transparent conductive film formed on one surface of the first substrate, absorbing charges of electro static discharge (ESD); a black matrix including a first black matrix formed on a corner of the other surface of the first substrate and end portions spaced apart from one end of the first black matrix at a predetermined interval for insulation; a ground electrode formed on one surface of the second substrate; and a connection portion connecting the transparent conductive film with the ground electrode, and extending over the end portions.

In another aspect of the present invention, a method for manufacturing a liquid crystal display device comprises the steps of forming a transparent conductive film, which absorbs charges of electro static discharge (ESD), on one surface of a first substrate; forming a black matrix including a first black matrix and end portions on a corner of the other surface of the first substrate, the end portions being spaced apart from one end of the first black matrix at a predetermined interval for insulation; forming a ground electrode on one surface of the second substrate; bonding the first substrate and the second substrate to each other; and forming a connection portion connecting the transparent conductive film with the ground electrode, wherein the connection portion extends over the end portions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

In the embodiment of the present invention, when some structure is formed "on or above" and "below or under" another structure, it should be understood that the disclosure includes that these structures are in contact with each other and that a third structure is interposed between the above structures.

A liquid crystal display device of the present invention will be described based on a structure and a manufacturing method of a black matrix formed on an upper substrate. Accordingly, a detailed description of a back light unit and a driving circuit portion will be omitted.

Figure 3:
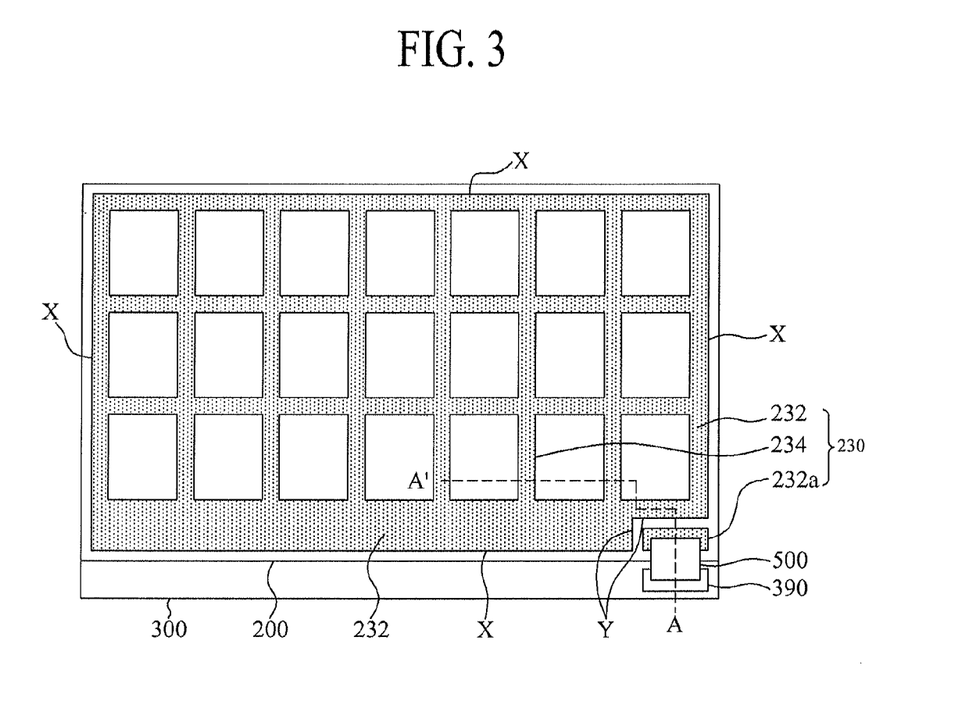
FIG. 3 is a plane view illustrating a liquid crystal display device according to one embodiment of the present invention.

FIG. 3 is a plane view illustrating a liquid crystal display device according to one embodiment of the present invention.

As shown in FIG. 3, a liquid crystal display device according to the present invention includes an upper substrate 200, a black matrix 230, a lower substrate 300, a ground electrode 390, and a connection portion 500.

The upper substrate 200 is provided with a transparent conductive film, the black matrix 230 and color filters.

The lower substrate 300 is provided with gate lines, data lines, a thin film transistor and the ground electrode 390.

The connection portion 500 is formed at one end of the liquid crystal display device 100, and connects the transparent conductive film with the ground electrode 390. The connection portion 500 may be made of Ag dot.

The black matrix 230 is formed on the upper substrate 200, and includes island shaped end portions 232a spaced apart from one another at predetermined intervals.

Hereinafter, the liquid crystal display device 100 according to the present invention, which includes the black matrix 230, will be described in more detail with reference to FIG. 4.

Figure 4:
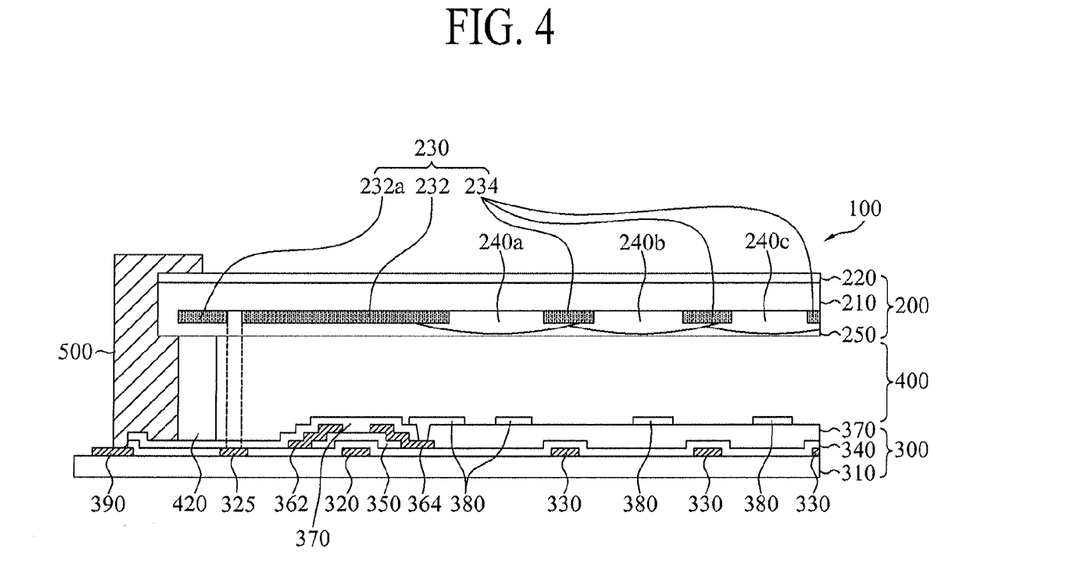
FIG. 4 is a cross-sectional view illustrating a liquid crystal display device according to the present invention, taken along line A-A' of FIG. 3.

FIG. 4 is a cross-sectional view illustrating a liquid crystal display device according to the present invention, taken along line A-A' of FIG. 3.

As shown in FIG. 4, the liquid crystal display device 100 according to the present invention includes the upper substrate 200, the lower substrate 300, the ground electrode 390, a liquid crystal layer 400, a sealant 420, and the connection portion 500.

The upper substrate 200 includes a first substrate 210, the black matrix 230, color filters 240a to 240c, an overcoat layer 250, and a transparent conductive film 220.

The first substrate 210 may be made of a transparent glass or a transparent plastic.

The black matrix (BM) 230 is formed below the first substrate 210, and serves to shield light of a non-display region where alignment of the liquid crystal layer 400 is not controlled.

The black matrix 230 includes a first black matrix 232, end portions 232a and a second black matrix 234.

The first black matrix 232 is formed along the corner of the upper substrate 200, and prevents light from leaking out towards the corner of the liquid crystal display device.

The second black matrix 234 is formed in the periphery of an opening, which is formed in a region corresponding to a pixel region of the lower substrate 300, to prevent light from leaking out towards the non-display region in the periphery of the pixel region. The second black matrix 234 is connected with the first black matrix 232.

The end portions 232a are spaced apart from one another at predetermined intervals at the end of the first black matrix 232 and formed in an island shape to maintain electric insulation from the first black matrix 232.

The end portions 232a are spaced apart from the first black matrix 232 at a predetermined interval for insulation from the first black matrix 232 and may be formed in a rod shape of a rectangle.

As the end portions 232a are spaced apart from the first black matrix 232, the first black matrix 232 may maintain insulation from the connection portion 500 even though the overcoat layer 250 and the end portions 232a are partially removed during a scribing process.

Accordingly, a black uniformity defect caused by electro static discharge (ESD) occurring in the upper substrate 200 along the first black matrix 232 may be reduced.

The black uniformity defect means that a black region is not formed uniformly on an entire surface of a liquid crystal display panel and a bright spot occurs on some surface of the liquid crystal display panel.

The first black matrix 232, the end portions 232a and the second black matrix 234 may be formed of the same material on the same layer. The first black matrix 232, the end portions 232a and the second black matrix 234 may include a conductive material.

The color filters 240a to 240c are formed on the black matrix 230, and include the first color filter 240a, the second color filter 240b and the third color filter 240c.

The first color filter 240a may be made of a color filter of any one of red (R), green (G) and blue (B), the second color filter 240b may be made of a color filter of another one of red (R), green (G) and blue (B), and the third color filter 240c may be made of a color filter of the other one of red (R), green (G) and blue (B). In other words, the first color filter 240a may be made of a color filter of one of red (R), green (G) and blue (B), the second color filter 240b may be made of a color filter of one of remained colors, and the third color filter 240c may be made of a color filter of the other of the remained colors. For example, the first color filter 240a may be made of a color filter of green (G), the second color filter 240b may be made of a color filter of blue (B), and the third color filter 240c may be made of a color filter of red (R).

Meanwhile, the color filters 240a to 240c may be formed on the second substrate provided with a thin film transistor. In this way, the structure that the thin film transistor and the color filters 240a to 240c are formed on the same substrate will be referred to as a color filter on TFT (COT) structure.

Since the COT structure does not need to consider a bonding margin when the black matrix is designed like the related art, it is advantageous in that an opening region is enlarged and the process is simplified when the upper substrate is formed.

The overcoat layer 250 is formed on the color filters 240a to 240c, and compensates for step difference caused by the color filters 240a to 240c to planarize the surface. The overcoat layer 250 is formed of an insulating material to prevent a ground voltage from flowing towards the black matrix 230 through the connection portion 500.

The transparent conductive film 220 is formed on the rear surface of the first substrate 210 and connected with the ground electrode 390 through the connection portion 500, and absorbs charges of electro static discharge (ESD) to flow the charges of ESD towards the ground electrode 390, whereby a damage caused by the ESC occurring on the surface of the liquid crystal display device 100 is avoided.

The transparent conductive film 220 may be made of a transparent conductive material such as indium tin oxide (ITO).

The lower substrate 300 includes a second substrate 310, gate lines (not shown), data lines (not shown), a light shielding element 325, a gate electrode 320, a gate insulating film 340, an active layer 350, a source electrode 362, a drain electrode 364, a passivation layer 370, a common electrode 330, a pixel electrode 380, and a ground electrode 390.

The second substrate 310 may be formed of a transparent material such as glass or plastic.

Although not shown, the gate lines are arranged on the lower substrate 300 in a first direction, for example, horizontal direction, and the data lines are arranged on the lower substrate 300 in a second direction, for example, vertical direction. In this way, the data lines are arranged to cross the gate lines, whereby a plurality of pixel regions are defined.

Although the gate and data lines may be arranged as straight lines, they are not limited to the straight lines and may be arranged as curved lines.

The gate electrode 320 is formed on the second substrate 310, and is formed of a conductive material to transmit an electric signal applied to the gate lines (not shown) to the thin film transistor.

The light shielding element 325 is formed below insulation portions between the first black matrix 232 and the end portions 232a. The light shielding element 325 prevents a light from leaking between the first black matrix 232 and the end portions 232a. The light shielding element 325 may be formed on the same layer as the gate electrode 320, but not limited to this. For example, the light shielding element 325 may be formed on the same layer as the source electrode 320.

The gate insulating film 340 is formed on the gate electrode 320, and may be made of a silicon oxide film (SiOx) or silicon nitride film (SiNx) for insulation among the gate electrode 320, the source electrode 362 and the drain electrode 364.

The active layer 350 is formed on the gate insulating film 340, and may be made of a material such as amorphous silicon and oxide semiconductor.

If a signal is applied to the gate electrode 320, the active layer 350 serves to form a channel where a current flows, whereby the signal applied to the source electrode 362 may be transferred to the drain electrode 364.

The source electrode 362 is extended from the data lines (not shown) on the active layer 350, and is made of a conductive metal to transfer a data signal, which is applied to the data lines, to the thin film transistor.

The drain electrode 364 is spaced apart from the source electrode 362 on the active layer 350 to face the source electrode 362, and is connected with the pixel electrode 380. The drain electrode 364 is made of a conductive metal and transfers the signal from the source electrode 362 to the pixel electrode 380.

The passivation layer 370 is formed on the source electrode 362 and the drain electrode 364 to perform an insulation function. The passivation layer 370 may be made of a silicon oxide film (SiOx) or silicon nitride film (SiNx).

The pixel electrode 380 is formed on the passivation layer 370, and is connected with the drain electrode 364 through a predetermined contact hole. To this end, the contact hole is formed in a predetermined region of the passivation layer 370, and the pixel electrode 380 and the drain electrode 364 are connected with each other through the contact hole.

The pixel electrode 380 is formed in each of the pixel regions, made of a transparent conductive material, and forms electric field in the liquid crystal layer 400 together with the common electrode 330.

The pixel electrode 380 is arranged in parallel with the common electrode 330. An alignment direction of the liquid crystal layer may be controlled through a horizontal electric field occurring between the pixel electrode 380 and the common electrode 330, which are arranged in parallel with each other.

Various modifications may be made in the aforementioned pixel electrode 380 and common electrode 330. For example, any one of the pixel electrode 380 and the common electrode 330 is formed in a plate structure and the other one is formed in a finger structure, whereby the alignment direction of the liquid crystal layer may be controlled by a fringe field between the pixel electrode 380 and the common electrode 330.

Meanwhile, although not shown, an alignment film for liquid crystal alignment may be formed on the pixel electrode 380.

The ground electrode 390 is formed at one end of the second substrate 310, more specifically one end of the second substrate 310 corresponding to the end portions 232a so as to minimize the length of the connection portion, and becomes a reference of the ground voltage of the liquid crystal display device 100.

The outside of the liquid crystal display device 100 is grounded by the ground electrode 390, and the ground electrode 390 serves to leak a surging current occurring in the transparent conductive film 220 out to the ground or leak the electro static charges absorbed in the transparent conductive film 220 out to the ground.

The liquid crystal layer 400 is formed in a space between the upper substrate 200 and the lower substrate 300, and a liquid crystal is injected into the liquid crystal layer 400 so that the liquid crystal layer 400 serves to change light transmittance depending on electric field change of the pixel electrode 380 and the common electrode 330.

The sealant 420 is formed along the outside of the upper substrate 200 and the lower substrate 300, and bonds the upper substrate 200 to the lower substrate 300 so as not to flow out the liquid crystal injected into the liquid crystal layer 400.

The connection portion 500 is formed outside the sealant 420 and electrically connects the transparent conductive film 220 of the upper substrate 200 with the ground electrode 390 of the lower substrate 300.

The connection portion 500 is formed to overlap the end portions 232a by extending over the end portions 232a. Referring to FIG. 3, it is preferable that the connection portion 500 is formed so as not to overlap the first black matrix 232. In particular, it is preferable that the connection portion 500 does not overlap the sides (X) of the first black matrix 232 which correspond to edges of the first substrate. Meanwhile, the connection portion 500 may overlap the sides (Y) of the first black matrix 232 which face the end portions 232a.

The connection portion 500 is formed by a printing method or dispensing method, and is formed of Ag-paste having good electric conductivity.

The connection portion 500 serves as a path that flows out the electro static charges absorbed in the transparent conductive film 220 to the ground through the ground electrode 390, or a path that flow out a surging current occurring in the transparent conductive film 220 to the ground through the ground electrode 390. Accordingly, the liquid crystal display device 100 may be protected from the ESD.

Figure 5A:
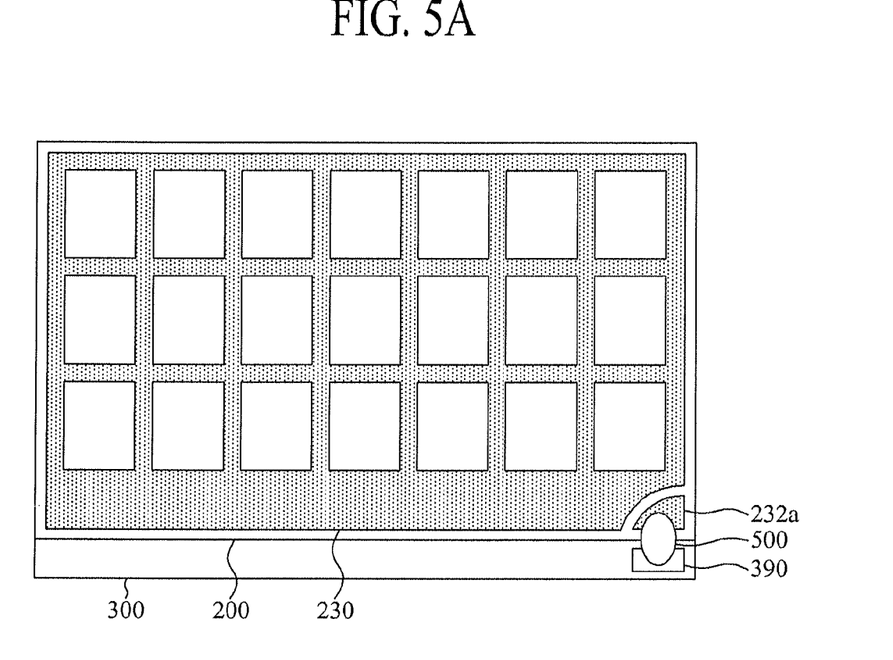
FIGS. 5A and 5B are plane views illustrating a liquid crystal display device according to another embodiment of the present invention.
Figure 5B:
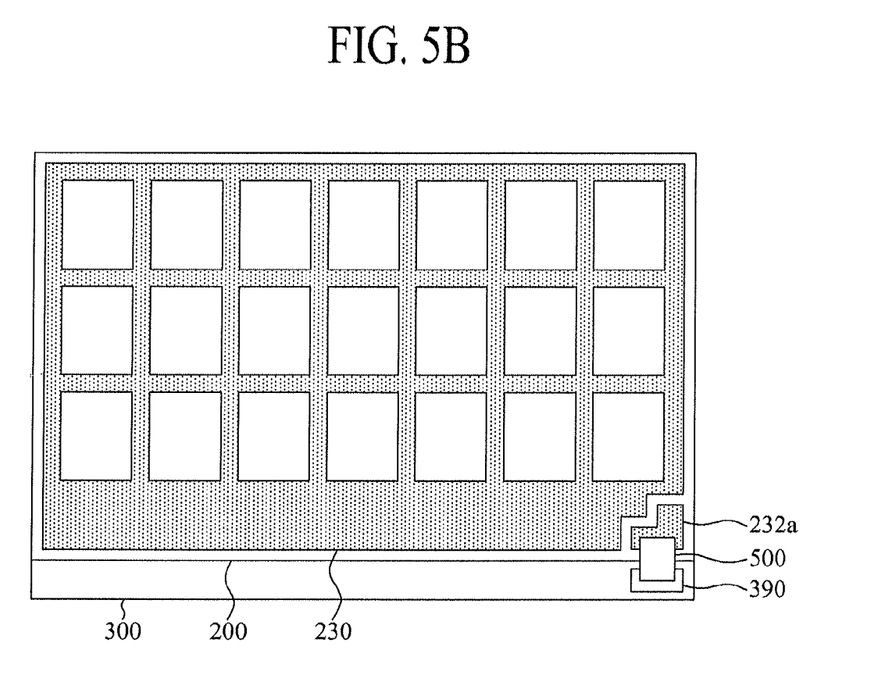

FIGS. 5A and 5B are plane views illustrating a liquid crystal display device according to another embodiment of the present invention.

First of all, as shown in FIG. 5A, the island shaped end portions 232a may be formed with a curved end. In this case, the connection portion 500 may also be formed in a shape having a curved end, such as a round shape.

The end portions 232a are electrically connected with the ground electrode 390 through the connection portion 500 to flow out the electro static charges applied to the transparent conductive film (not shown) formed on the upper substrate 200.

At this time, the connection portion 500 may be formed at one corner of the liquid crystal display device.

Next, as shown in FIG. 5B, the island shaped end portions 232a may be formed in a ']' shaped curve of which one corner is recessed.

The end portions are electrically connected with the ground electrode 390 through the connection portion 500 to flow out the charges of ESD applied to the transparent conductive film (not shown) formed on the upper substrate 200.

Figure 6A:
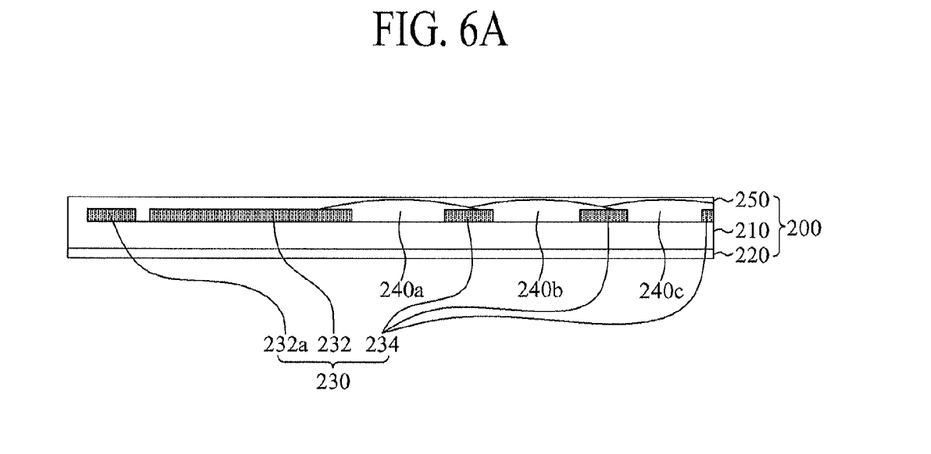
FIGS. 6A to 6C are cross-sectional views illustrating process steps of one embodiment according to the present invention.
Figure 6B:
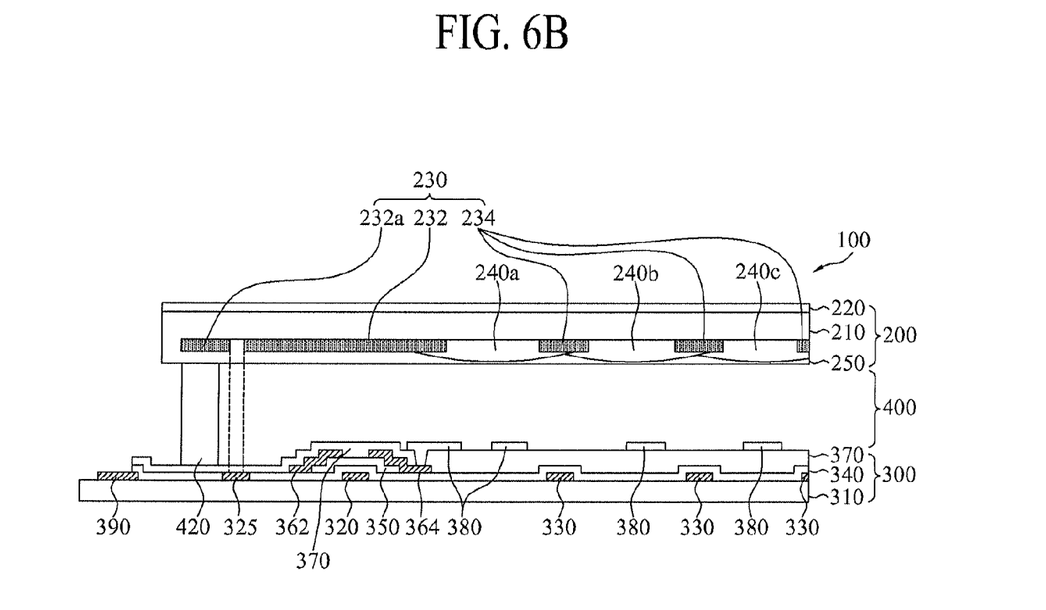
Figure 6C:
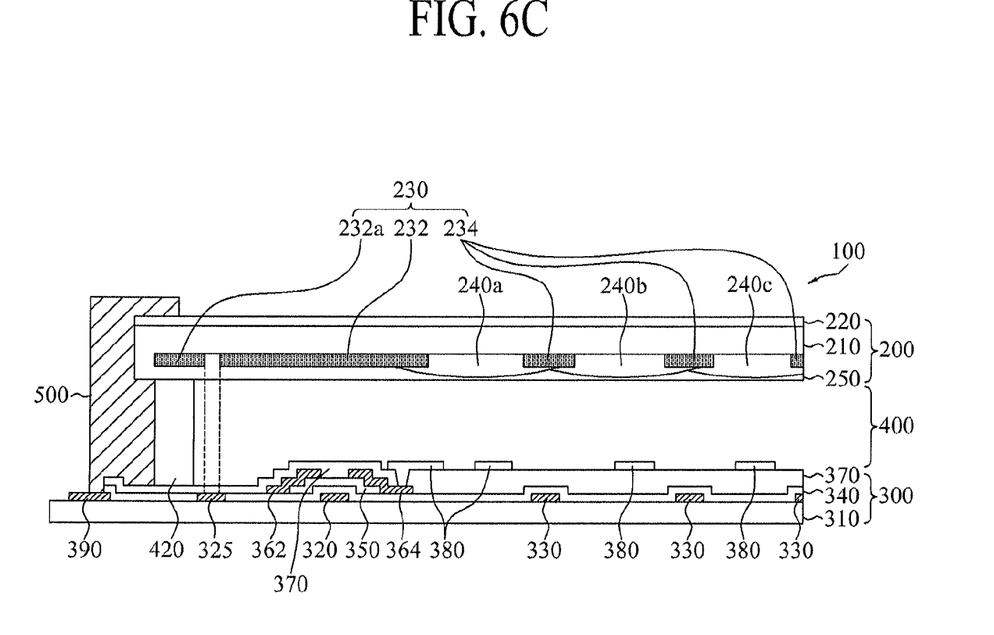

FIGS. 6A to 6C are cross-sectional views illustrating process steps of one embodiment according to the present invention.

First of all, as shown in FIG. 6A, the transparent conductive film 220 absorbing the charges of ESD is formed on the first substrate 210 of the upper substrate 200.

Next, the black matrix 230 is formed below the first substrate 210.

At this time, the black matrix 230 includes the first black matrix 232 shielding light leakage along the corner of the first substrate 210, the end portions 232a spaced apart from one another at one end of the first black matrix 232 in an island shape to maintain insulation from the first black matrix 232, and the second black matrix 234 formed along the corner of the opening corresponding to the pixel region.

At this time, the first black matrix 232, the end portions 232a and the second black matrix 234 are formed at the same time by the same process using one mask.

The end portions 232a are spaced apart from the first black matrix 232 at a predetermined interval, whereby the end portions 232a may maintain insulation from the first black matrix 232 even though the end portions 232a are partially removed during the scribing process.

Accordingly, the black uniformity defect caused by the ground current flowing along the first black matrix 232 may be reduced.

Next, the color filters 240a to 240c are formed on the black matrix 230, and the overcoat layer 250 is formed on the color filters 240a to 240c.

The color filters 240a to 240c may be formed in such a manner that the first color filter 240a, the second color filter 240b and the third color filter 240c are sequentially formed.

The first color filter 240a may be made of a color filter of any one of red (R), green (G) and blue (B), the second color filter 240b may be made of a color filter of another one of red (R), green (G) and blue (B), and the third color filter 240c may be made of a color filter of the other one of red (R), green (G) and blue (B). In other words, the first color filter 240a may be made of a color filter of one of red (R), green (G) and blue (B), the second color filter 240b may be made of a color filter of one of remained colors, and the third color filter 240c may be made of a color filter of the other of the remained colors. For example, the first color filter 240a may be made of a color filter of blue (B), the second color filter 240b may be made of a color filter of red (R), and the third color filter 240c may be made of a color filter of green (G).

At this time, the color filters 240 may be formed on the second substrate 310 to form a COT structure as described above, and its repeated description will be omitted.

The overcoat layer 250 is made of an insulating material, formed on the color filters 240, and removes step difference caused by the color filters 240 to planarize the surface. Also, the overcoat layer 250 prevents the ground voltage from flowing towards the black matrix 230 through the connection portion 500.

Next, as shown in FIG. 6B, the thin film transistor is formed on the second substrate 310 of the lower substrate 300, and the ground electrode 390 is formed at one end of the second substrate 310, more specifically one end of the second substrate 310 corresponding to the end portions 232a.

Also, the common electrode 330 and the pixel electrode 380 are formed to drive the liquid crystal in accordance with the electric field of an IPS mode.

The thin film transistor is formed in such a manner that the gate electrode 320, a light shielding element 325, the gate insulating film 340, the active layer 350, the source electrode 362, the drain electrode 364 and the passivation layer 370 are deposited and etched sequentially.

Next, the upper substrate 200 and the lower substrate 300 are bonded to each other and the liquid crystal is injected into the bonded substrate to form the liquid crystal layer 400.

The process of bonding the upper substrate 200 and the lower substrate 200 to each other by interposing the liquid crystal layer 400 may be performed by a vacuum injection method or liquid crystal dispensing method.

Afterwards, as shown in FIG. 6C, the connection portion 500, which connects the transparent conductive film 220 with the ground electrode 390, is formed.

The connection portion 500 is formed by a printing method or dispensing method, and is formed of Ag-paste having good electric conductivity.

The connection portion 500 is formed to overlap the end portions 232a by extending over the end portions 232a. Referring to FIG. 3, it is preferable that the connection portion 500 is formed so as not to overlap the first black matrix 232. In particular, it is preferable that the connection portion 500 does not overlap the sides (X) of the first black matrix 232 which correspond to edges of the first substrate. Meanwhile, the connection portion 500 may overlap the sides (Y) of the first black matrix 232 which face the end portions 232a.

The connection portion 500 serves as a path that flows out the electro static charges absorbed in the transparent conductive film 220 through the ground electrode 390, or a path that flow out a surging current occurring in the transparent conductive film 220 to the ground through the ground electrode 390. Accordingly, the liquid crystal display device 100 may be protected from the ESD.

As described above, according to the present invention, the following advantage is obtained.

Since the charges of ESD does not flow into the liquid crystal display panel through the black matrix, the black uniformity defect may be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A liquid crystal display device comprising:
    first and second substrates facing each other;
    a transparent conductive film on an outwardly facing first surface of the first substrate, absorbing charges of electro static discharge;
    a ground electrode on one surface of the second substrate;
    a connection portion connecting the transparent conductive film with the ground electrode, and extending over a corner of the first substrate;
    a black matrix disposed between an overcoat layer and an inwardly facing surface of the first substrate wherein the black matrix comprises a first black matrix portion to define a grid portion and a separate black matrix end portion wherein the black matrix end portion is disposed at the corner of the first substrate and is insulated from the first black matrix portion;
    a light shielding element disposed on the second substrate, the light shielding element opposing a gap between the first black matrix portion and the separate black matrix end portion and overlapping an entire width of the gap; and
    a sealant for bonding the first and second substrates, wherein the sealant is disposed outside the gap and the light shielding element without overlapping the gap and the light shielding element,
    wherein the connection portion contacts the transparent conductive film and the overcoat layer at the corner and extends to the ground electrode.

2. The liquid crystal display device of claim 1, wherein the separate black matrix end portion is in an island shape.

3. The liquid crystal display device of claim 1, wherein the first black matrix portion and the separate black matrix end portion are of the same material and on the same layer.

4. The liquid crystal display device of claim 1, wherein the ground electrode is at one end of the second substrate to correspond to the separate black matrix end portion.

5. The liquid crystal display device of claim 1, wherein the connection portion does not overlap sides of the first black matrix portion, which correspond to edges of the first substrate.

6. The liquid crystal display device of claim 1, wherein the light shielding element is wider than the gap.

7. A method for manufacturing a liquid crystal display device, the method comprising:
    forming a transparent conductive film, which absorbs charges of electro static discharge, on an outwardly facing first surface of a first substrate;
    forming a ground electrode on one surface of a second substrate;
    bonding the first substrate and the second substrate to each other;
    forming a connection portion connecting the transparent conductive film with the ground electrode and extending over a corner of the first substrate; and
    forming a black matrix between an overcoat layer and an inwardly facing surface of the first substrate wherein the black matrix comprises a first black matrix portion to define a grid portion and a separate black matrix end portion wherein the black matrix end portion is disposed at the corner of the first substrate and is insulated from the first black matrix portion;
    forming a light shielding element on the second substrate, the light shielding element opposing a gap between the first black matrix portion and the separate black matrix end portion and overlapping an entire width of the gap; and
    forming a sealant for bonding the first and second substrates, wherein the sealant is disposed outside the gap and the light shielding element without overlapping the gap and the light shielding element,
    wherein the connection portion contacts the transparent conductive film and the overcoat layer at the corner and extends to the ground electrode.

8. The method of claim 7, wherein the first black matrix portion and the separate black matrix end portion are formed by the same process and at the same time.

9. The method of claim 7, wherein the separate black matrix end portion is formed in an island shape.

10. The method of claim 7, wherein the ground electrode is formed at one end of the second substrate to correspond to the separate black matrix end portion.

11. The method of claim 7, wherein the connection portion does not overlap sides of the first black matrix portion, which correspond to edges of the first substrate.

12. The method of claim 7, wherein the light shielding element is formed when forming a gate line.

* * * * *